April 22, 1958 K. RÜNZI 2,831,676
FOLDING MACHINE
Filed Oct. 13, 1953
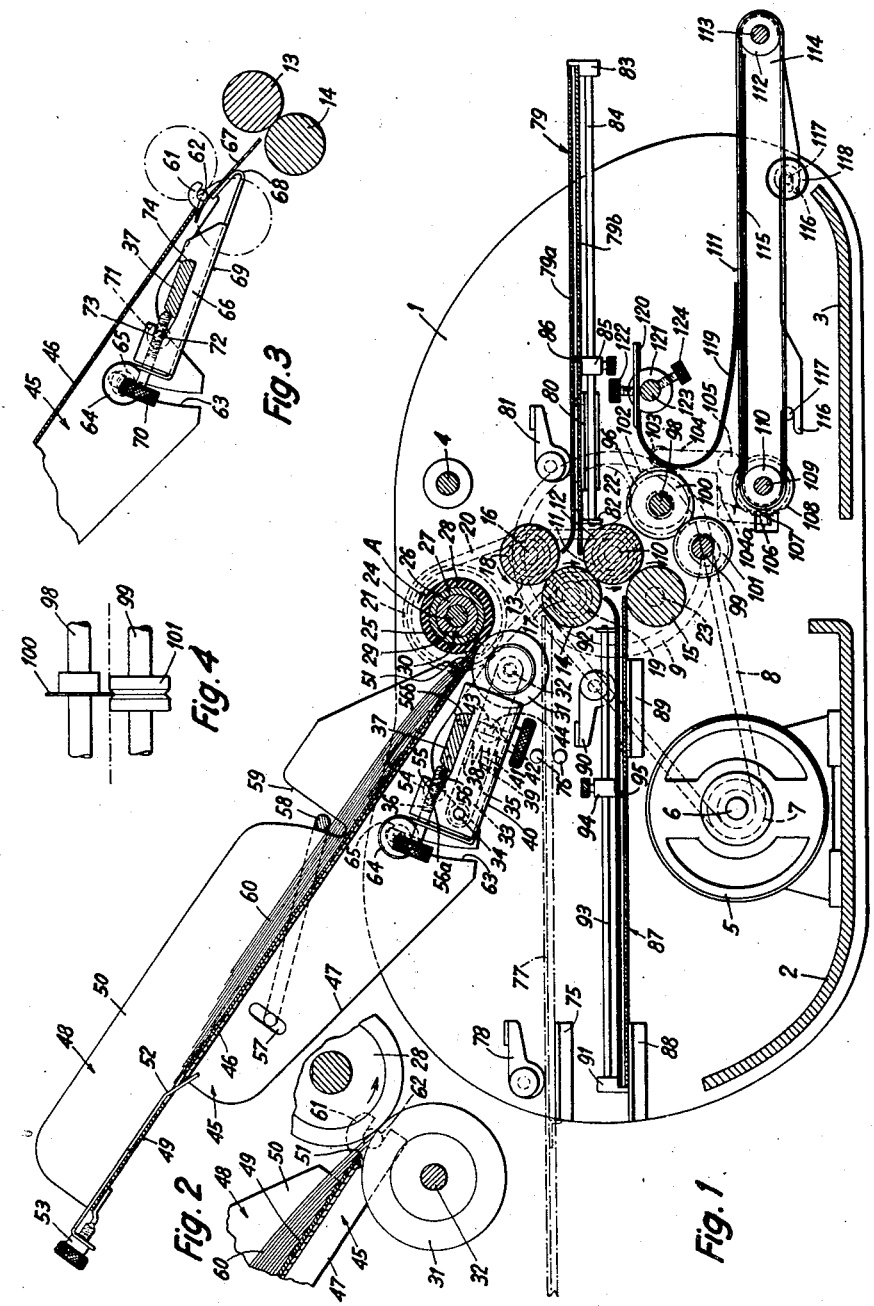

United States Patent Office 2,831,676
Patented Apr. 22, 1958

2,831,676

FOLDING MACHINE

Kurt Rünzi, Berne, Switzerland

Application October 13, 1953, Serial No. 385,756

Claims priority, application Switzerland October 14, 1952

3 Claims. (Cl. 270—68)

My present invention relates to improvements in folding machines comprising folding pockets. Such folding machines are known per se, but do not satisfy the requirements of a small business machine, since they require relatively much space owing to the non-horizontal position of the folding pockets. Such folding machines, further, have the disadvantages that for example the last folding pocket cannot be replaced by a table on which the sheets to be folded may be stacked and subjected to a further operation.

My present invention aims to overcome the said disadvantages by arranging the folding pockets horizontally and in parallel relation with each other.

One form of the invention is shown in the accompanying drawing in which:

Fig. 1 is a vertical longitudinal section,

Fig. 2 shows an enlarged view of a detail of Fig. 1,

Fig. 3 is a vertical longitudinal section, in parallel relation with that of Fig. 1, through a further detail of the machine, and Fig. 4 shows a schematical view of the tools of an attachment.

In the machine shown, two bearing walls 1, of which only one is shown in the drawings, are interconnected by curved stays 2 and 3 and a spacer 4 so that these parts together form a rigid frame structure. The stay 2 serves as mount for a drive motor 5 which is secured to said stay in a manner not further shown. On the motor shaft 6 is mounted a first pulley 7 which through a belt 8 drives a second pulley 9 which is fixed to a shaft 10, and the latter in turn is mounted in the two bearing walls 1 in a manner not further shown. A cord pulley 11 and a roller 12 are fixed to shaft 10. The arrangement is such that said roller is situated between the two bearing walls 1, whilst the belt pulley 9 and the cord pulley 11 are secured to that end of shaft 10 which projects beyond the bearing walls. Three further rollers 13 to 15 are mounted in the latter, the surfaces of the rollers 13 and 14, 14 and 12, and 12 and 15 contacting each other along a surface line or generatrix. On each of those ends of the shafts 16, 17 of the two rollers 13, 14 which project beyond one of the two bearing walls 1, is mounted a further cord pulley 18 and 19 respectively, which two pulleys serve as idlers for a belt 20 which interconnects the cord pulley 11 with a belt pulley 21. On that end of shaft 10 which projects beyond one of the bearing walls 1, a gear wheel (not further shown) is mounted which on one hand meshes with a pinion 22 and, on the other hand, with a gear wheel fixed to shaft 17 of roller 14 and a gear wheel fixed to shaft 23 of roller 15. The gear wheel fixed to shaft 17 meshes with a gear wheel fixed to shaft 16 so that all the rollers 12 to 15 and the pinion 22 are driven from shaft 10. The transmission gear comprising said gear wheels and pinion, in its totality is disposed on the outside of one of the two bearing walls 1.

The shafts 16, 17 and 23 are resiliently mounted, in a manner not further shown, in the bearing walls, namely shaft 16 in the plane passing, in the inoperative position shown, through the shafts 16 and 17, shaft 17 in the plane passing through shaft 17 and shaft 10, and shaft 23 in the plane passing through shaft 23 and shaft 10.

Belt pulley 21 is fixed to the axle 24 of a feed roller 25 which comprises a first sleeve 26 fixed to axle 24 and a second sleeve 27 freely rotatable on sleeve 26 and on which is mounted a hard-rubber cover 28. The fixed sleeve 26 is provided with a skew groove 29 in which is loosely inserted a ball 30 so that the outer sleeve 27 with the hard-rubber cover 28 only then is rotated by axle 24 when the latter rotates in direction of the arrow A. The free-wheeling means formed by the two sleeves 26 and 27, groove 29 and ball 30, thus renders it possible, among other things, that the outer sleeve 27 together with cover 28 may be accelerated relatively to axle 24 without the latter varying its number of revolutions. The feed roller 25 contacts along a surface line a cylindrical abutment 31 which is fixed on a non-rotatable stud 32 which is held in two bearing brackets 33 of which only one is shown in the drawing. The two brackets 33 are pivoted on an axle 34 to a U-shaped bearing member 35 which by means of a screw 36 is clamped to a rail 37. For such purpose, the screw 36 is threaded in a cylindrical nut 54 of which lateral pins 55 are supported on an abutment 56a of a guide cutout 56 of member 35, whilst a hook-shaped part 56b of said cut-out embraces that edge of rail 37 which is remote from the screw. Rail 37 extends from one bearing wall 1 to the other and is secured there in a manner not further shown. The two bearing brackets 33 are interconnected by a supporting plate 38 against which bears one end of a compression spring 38, whilst the other end of the latter abuts against the bottom 40 of the U-shaped bearing member 35 and is guided by a pin 41. The pivotal movement of the bearing brackets 33 together with stud 32 and abutment 31 about axle 34, caused by spring 39, is limited by the screw 42 which is threaded in the cylindrical nut 43, two lateral pins 44 being engaged in corresponding recesses of the bearing brackets. The slewing angle of these bearing brackets thus may be adjusted by turning the screw 42, the bracket and the abutment 31 in any position being capable to spring clockwise until the supporting plate 38 abuts against the pin 41.

In Fig. 3 are shown details of securing the table 45 for the automatic paper feed, which parts may be disposed in front of or behind the U-shaped bearing member in Fig. 1. Table 45 mainly comprises a plate or leaf 46 and gusset plates 47. On leaf 46 is secured a V-shaped stack holder 48 with a bottom 49 and holding sheets 50 by means of a hook 51 applied about the lower edge of leaf 46, mounting a supporting tongue 52 on the top edge of leaf 46 and subsequently pushing the tongue 52 downwardly by means of screw 53, whereby the holder 48 is clamped to the table leaf 46. In a slot 57 of the gussets 47 is held a depressing bracket 58 of which the free end passes through a cutout 59 of the holding sheets and bears on the upper side of the stack 60 of the sheets to be folded. On the lower edge of table leaf 46 are provided two hooks 61 of which only one is shown and which bear against a rigid rod 62 secured in the bearing walls 1. The gussets 47 comprise a circular slot 63 of which the center is situated at the point of intersection of the sheet plane and the geometrical axis of axle 62. To each of the two bearing walls is secured a screw 64 having a collar 65, between which collar and the respective bearing wall 1 are inserted the gussets which are clamped in place by means of screw 64. The table 45, therefore, is secured by applying the two hooks 61 to rod 62, whereupon the gussets 47 are introduced between the collars 65 and the respective bearing wall 1 over the shafts of the screws 64 and rotated until the table leaf 46 has the desired inclination. In such latter position, the screws 64 are tightened and the table arrested. The U-shaped clamping means 66 serves for securing the feed tongues 67 which must be in the same position irrespective of the position of table 45 with respect to the rollers 13—14 which are only schematically indicated in Fig. 3. The tongues 67 serve for transferring the paper sheets from the feed means formed by the feed roller 25 and the abutment 31 to said pair of rollers 13—14. The feed tongues 67 extend laterally past the feed roller 25 and the abutment 31 and are connected to the bottom 69 of the clamping device 66 through the stirrup 68. The clamping device 66 is secured to rail 37 by means of a screw 70 which passes through the cylindrical nut 71. The latter comprises two lateral pins 72 which are engaged in an abutment 73 of the clamping device, whilst a second hook-shaped abutment 74 embraces that edge of rail 37 which is remote from screw 70.

Through angle irons 75 and two pins 76 are formed guides for table 77 on the bearing walls 1, which guides are so arranged that the top side of the introduced table substantially coincides with the upper horizontal tangential plane on roller 14. Table 77 may be inserted from the left as shown in the drawing, until its front end extends to immediately in front of the roller 14, in which position the table may be clamped by means of an eccentric clamping stirrup 78. On that side of the rollers 12 to 15 which is opposite to the guides 75, 76 there is arranged the first folding pocket 79 which also is horizontal. Pocket 79 is inserted from the right over the angles 80 and clamped in position by means of the eccentric clamping stirrup 81. The upper pocket sheet 79a at its end is bent down so far as is required by the unhindered entrance of a paper sheet fed through the pair of rollers 13—14. On the bottom side of the pocket is held a rod 84 by means of the bearing brackets 82 and 83, on which rod is held a limiting slide 85 in an adjustable and clampable manner. The extension 86 of slide 85 enters into the pocket inside through a slot (not shown) in the lower pocket sheet 79b. In a manner similar to the pocket 79, there is mounted on the opposite side a pocket 87 on angles 88 and 89 and clampable by means of an eccentric clamping stirrup 90. Here, the bearing brackets are designated by 91—92, the rod by 93, the limiting slide by 94, and the extension by 95. Whilst the pocket 79 is disposed between the roller pairs 13—14 on the one hand and 14—12 on the other hand, the pocket 87 on the opposite side is disposed horizontally between the roller pairs 12—14 on the one hand, and 12—15 on the other hand.

Pinion 22 is in mesh with a gearwheel 96. Gearwheel 96 is secured on that end of an axle 98 which projects beyond the bearing wall 1. On axle 98 is secured an indenting disc 100 which coacts with an indenting abutment 101. By spring means not shown, the abutment 101 is resiliently mounted in the plane passing through the two axles 98 and 99. In lieu of the indenting means 100—101, any other means could be provided for a further processing step for the folded paper sheets, such as a perforating attachment, a gumming attachment, a moistening attachment and the like. On axle 98 is secured an eccentric 102 against which is braced a roller 103 of one arm 104 of a bell crank 104—104a which is pivoted on an axle 105 to one of the bearing walls 1. To the end of arm 104a is pivoted a pawl arm 106 which through its pawl 107 engages the teeth of a helical gearwheel 108. The latter is rotatable about an axle 109 which carries one of the idlers 110 of a conveyor band 111, the latter being engaged by said idler and a further idler 112. The axle 109 of idler 110, as well as the axle 113 of idler 112, are mounted in the sidewalls 114 of a delivery conveyor which comprises a table 115 below the upper portion of the conveyor band 111, and further four hook-shaped lugs 116 insertable in pins 117 of the bearing walls 101, a screw 118 serving to clamp the delivery conveyor to the bearing walls.

With the delivery conveyor coacts a depressing attachment which mainly comprises a leaf spring 119 bearing against the top portion of the conveyor band 111 and of which tongues 120 pass through slots of an adjusting ring 121. Spring 119 is clampable to ring 121 by means of a screw 122. Ring 121 is slidably mounted on a rod 123 which is anchored to both bearing walls 1 and may be arrested in the corresponding position by means of a screw 124. The delivery conveyor thus may be entirely removed by loosening the screws 118, whilst the leaf spring 119 is removable by loosening the screw 122.

From the design and construction described, the following mode of operation stems:

If the folding machine is intended to operate with automatic paper feed, table 45 through its hooks 61 is applied to rod 62, as shown in the drawing and described above. The slots 63 are mounted over the shafts of the screws 64 and clamped in position by means of these screws 64 after having chosen a suitable angle. The stack of sheets to be folded is prepared so that the forward edges of the upper sheets slightly project beyond corresponding edges of the lower sheets, whereupon the stack 60 of sheets thus prepared is inserted into the stack holder underneath stirrup 58. The angle of table 46 has to be chosen such that the stack, as soon as it is capable of doing so, starts to slide. The position then is that shown in Fig. 2 in an enlarged scale, where the uppermost sheet projects inwardly between feed roller 28 and abutment 31 of the feed means 28—31, whilst the next following sheet bears against the rigid, non-rotating abutment 31. From this follows a further criterion for the choice of the angle of table 46 in that the latter on the one hand has to be sufficiently large so that the stack will slide and, on the other hand, not so large as to render impossible a support through the second sheet, and the entire stack enters between feed roller 28 and abutment 31.

When the topmost sheet has been entirely separated from the stack, the next following sheet enters between feed axle and abutment, the stack at the same time following until the second sheet lies against the abutment.

The motor shaft rotates counterclockwise, the same as roller 12, feed roller 25, and roller 13. The rollers 14 and 15 rotate clockwise. Through the rotation of feed roller 25 which is driven from the motor via belts 8 and 20, the topmost sheet is seized and fed to the roller pair 13—14 through the feed tongues 67 and the stationary abutment 31 which is capable of resiliently yielding according to the sheet thickness. When the sheet still is clamped between feed roller 25 and abutment 31, its forward edge is seized by the roller pair 13—14 and pushed into pocket 79.

Since the belt pulley 21 of the feed means is larger than the roller gearwheels, the feed roller 25 rotates at a slower rate than the conveyor rollers 12 to 15 so that, after the forward sheet edge has been seized by the roller pair 13—14, the sheet is removed at an accelerated pace. Thanks to the free-wheeling means 26 to 30, the feed roller is capable of following such accelerated movement. In a manner known per se, the sheet is pushed into pocket 79 until its forward edge abuts against extension 86. The latter, as well as the extension 95, have been previously set on the rods 84 and 93 respectively, in accordance with the length of sheet and the desired spacing between the folds and the sheet margins, by moving and subsequent clamping of the limiting slides 85 and 94. As soon as the forward edge abuts against extension 86, the sheet sags in front of the pocket, the point of bend is seized by the roller pair 14—15, the sheet is folded once and led towards pocket 87. At that point, the same operations are repeated in that the folded edge abuts against extension 95 and the sheet, owing to its continuous movement through the roller pair 14—15, sags in front of the pocket entrance, the point of bend is seized by the roller pair 12—15, and the sheet is folded a second time and carried off in the opposite direction.

The spring mounting of the rollers 13 to 15 permits of an operation free from disturbance even when the sheets to be folded are of varying thickness.

If, for example, the indenting device 100—101 is not inserted, the sheet which has been folded twice at right angles to its longitudinal direction arrives on the delivery device where it is removed through the conveyor band. The latter is operated by the gearwheel (not shown) fixed to shaft 10, via pinion 22 and eccentric 102 which intermittently rocks the bell crank 104—104a, so that the pawl 107 rotates the helical gear 108 through one tooth each time and, thus, intermittently moves the conveyor band. If the indenting device is inserted, the sheet folded twice may be indented additionally yet through its passage between the indenting disc 100 and the indenting abutment 101. As stated before, another means may take the place of the indenting device 100—101 so that the folded sheets subsequently may be subjected yet to an additional operation.

When the sheets to be folded are fed by hand, the table shown in Fig. 1 by dash and dot lines is inserted into the guides 75 and between the rods 76 and clamped in the respective position by means of the eccentric clamping stirrups 78. The topmost hand-fed sheets immediately get between the roller pair 13—14 and are folded twice in the way and manner already described, perhaps subjected to an additional operation and subsequently carried away from the machine. Such additional use solely stems from the fact that the two pockets are horizontally disposed and that the feed table also may be horizontally disposed.

The horizontal position of feed table and folding pockets affords a still further use of the folding machine. The latter may be used, for example, as indenting means or, in accordance with the tool rollers which are inserted in lieu of the indenting means 100—101, as perforating, gumming or moistening means. In such case, the pocket 87 is removed after loosening the eccentric clamping stirrups 90, and replaced by the table 77 and clamped in position. When feeding by hand, the individual sheets then may be fed to the roller pair 12—15 and thence to the respective tools.

Thanks to the horizontal arrangement of the two pockets, there is afforded the possibility of not only providing a substantially more space-saving machine, but also of using the latter for a plurality yet of other purposes.

I claim:

1. In a folding machine for folding sheets: a frame, paired folding rollers supported in said frame, folding pocket members mounted on said frame and adapted to receive sheets fed between said paired rollers, each pocket member being associated with a pair of said rollers, one of said pocket members being removable, means providing a horizontal support for said removable pocket member, the latter pocket member normally being in operative position with respect to a pair of said folding rollers, and being supported on said support means, releasable clamping means positioned above said support means and said pocket member, said clamping means normally engaging said pocket member and retaining said pocket member against said support means, said clamping means being movable out of clamping engagement with said removable pocket member, said pocket member being freely removable when said clamping means is released, a feed table member, said feed table member having a lower surface adapted to supportingly engage said means for supporting said pocket member when said pocket member is removed from the latter, said table member being movable into operative position with respect to one of said rollers by placement on said means of support, said clamping mean being operable to clamp said table member against said means of support in operative position with respect to one of said rollers, said table member having an inner end and being formed so that when said table member is clamped in operative position said inner end is in substantial alinement with the periphery of one of said rollers for feeding paper from said table member onto the latter roller.

2. The apparatus of claim 1 wherein said support means comprises spaced flanges.

3. The apparatus of claim 1 wherein said pocket member and said feed table have portions substantially the same vertical distance above their lower surfaces and spaced from their inner ends substantially the same distance for engagement by said clamping means.

References Cited in the file of this patent

UNITED STATES PATENTS

| | | |
|---|---|---|
| 718,173 | Germany | Mar. 5, 1942 |
| 1,525,969 | Waterworth | Feb. 10, 1925 |
| 1,550,851 | Trautman et al. | Aug. 25, 1925 |
| 1,587,244 | Shipley | June 1, 1926 |
| 1,707,979 | Glasgow | Apr. 9, 1929 |
| 1,770,312 | Kleinschmit | July 8, 1930 |
| 1,825,247 | Olson | Sept. 29, 1931 |
| 2,058,877 | Hitchock | Oct. 27, 1936 |
| 2,224,137 | Breman et al. | Dec. 10, 1940 |
| 2,230,168 | Spiess | Jan. 28, 1941 |
| 2,670,954 | Back | Mar. 2, 1954 |

FOREIGN PATENTS

| | | |
|---|---|---|
| 441,557 | Great Britain | Jan. 22, 1936 |